(12) United States Patent
Wilson et al.

(10) Patent No.: US 9,127,568 B2
(45) Date of Patent: Sep. 8, 2015

(54) TURBINE CASING

(75) Inventors: Bradley Edwin Wilson, Simpsonville, SC (US); Matthew Stephen Casavant, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 749 days.

(21) Appl. No.: 13/343,322

(22) Filed: Jan. 4, 2012

(65) Prior Publication Data
US 2013/0170978 A1    Jul. 4, 2013

(51) Int. Cl.
*F01D 25/24* (2006.01)
*F01D 25/26* (2006.01)

(52) U.S. Cl.
CPC .............. *F01D 25/243* (2013.01); *F01D 25/26* (2013.01)

(58) Field of Classification Search
USPC ........... 415/108, 134, 177, 178, 182.1, 213.1, 415/214.1, 215.1
See application file for complete search history.

(56) References Cited

U.S. PATENT DOCUMENTS

| | | | |
|---|---|---|---|
| 1,957,699 A | | 5/1934 | Dahlstrand |
| 1,957,700 A | | 5/1934 | Dahlstrand |
| 4,492,517 A | * | 1/1985 | Klompas ................. 415/139 |
| 5,133,641 A | | 7/1992 | Groenendaal, Jr. et al. |
| 6,050,776 A | * | 4/2000 | Akagi et al. ............ 415/209.4 |
| 7,037,065 B2 | | 5/2006 | Reigl |
| 8,197,191 B2 | * | 6/2012 | Binks et al. ............ 415/119 |
| RE43,611 E | * | 8/2012 | Marx et al. ............. 415/208.2 |
| 8,668,450 B2 | * | 3/2014 | Chevrette .............. 415/211.2 |
| 2010/0260602 A1 | * | 10/2010 | Binks et al. ............ 415/214.1 |
| 2013/0170978 A1 | * | 7/2013 | Wilson et al. .......... 415/213.1 |
| 2014/0064927 A1 | * | 3/2014 | Binks et al. ............ 415/119 |

* cited by examiner

*Primary Examiner* — Edward Look
*Assistant Examiner* — Christopher R Legendre

(57) ABSTRACT

A turbine casing includes a plurality of arc-shaped segments having a flange at each side end to connect to a flange of an adjacent arc-shaped segment. The flange extends outward from an outer surface of each arc-shaped segment and extends along the outer surface in a front-to-rear direction. Each arc-shaped segment has a portion of the outer surface that is co-linear with the flange in a front-to-rear direction that does not include the flange.

14 Claims, 4 Drawing Sheets

TURBINE CASING

BACKGROUND OF THE INVENTION

The subject matter disclosed herein relates to a turbine. In particular, the subject matter disclosed herein relates to a turbine having an unbolted portion.

A turbine includes a rotor and a casing surrounding the rotor. A fluid, such as gas, air, or liquid, passes through blades of the rotor to drive a shaft of the turbine. The turbine is designed such that during operation, a clearance exists between the casing and blades, or buckets, of the rotor to prevent rubbing of the buckets against the casing. The clearance is maintained as small as possible to prevent fluid from passing around the outside of the buckets. Instead, the fluid is directed at the buckets of the turbine and between the buckets to allow the turbine to function efficiently.

When the turbine is heated and cooled, the components of the turbine, including the casing, expand and contract according to their thermal response characteristics. If the thermal response of the casing is too slow or uneven around the buckets of the rotor, the buckets rub against the casing. In particular, during start-up, before the casing has been heated and expanded sufficiently, the clearance is small, and uneven expansion of the casing results in rubbing of the buckets against the casing. Since the rubbing of the buckets against the casing leads to loss of material from the bucket tips, the rubbing leads to an increase in the clearance between the casing and the bucket tips, deteriorating performance of the turbine.

BRIEF DESCRIPTION OF THE INVENTION

According to one aspect of the invention, a turbine includes a casing having a plurality of arc-shaped segments to together form a substantially circular cross-section shape of the casing, the casing having a front rim to define a front opening and a rear rim to define a rear opening, and the plurality of arc-shaped segments extending in a front-to-rear direction between the front rim and the rear rim; and an affixing protrusion extending radially from an outer surface of the casing at each junction of the plurality of arc-shaped segments to affix adjacent arc-shaped segments to each other. The casing includes an annular region on the outer surface of the casing having no affixing protrusion, the annular region having a thickness from an inside surface to the outside surface less than a thickness of the casing at the affixing protrusion from the inside surface to the outside surface.

According to another aspect of the invention, a turbine casing comprises a plurality of arc-shaped segments, each arc-shaped segment having a front rim at a front end, a rear rim at a rear end, and a flange at each side end to connect to a flange of an adjacent arc-shaped segment from among the plurality of arc-shaped segments, the flange extending outward from an outer surface of each arc-shaped segment and extending along the outer surface in a front-to-rear direction, each arc-shaped segment having a portion of the outer surface that is co-linear with the flange in a front-to-rear direction that does not include the flange, the portion that does not include the flange having a width from an inner surface of the arc-shaped segment to the outer surface of the arc-shaped segment that is less than a width of the arc-shaped segment at the flange from the inner surface of the arc-shaped segment to the outer surface of the arc-shaped segment.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
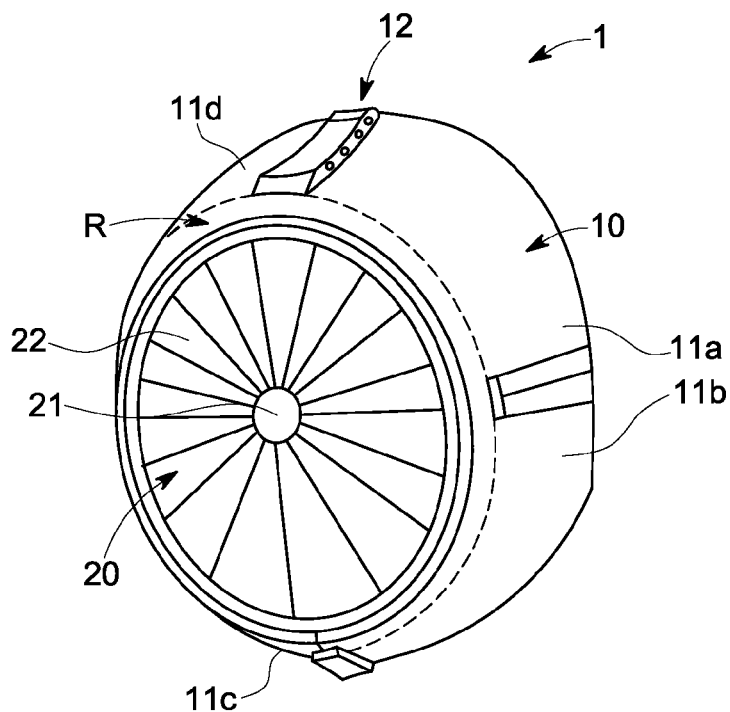
FIG. 1 is a turbine.

FIG. 1 illustrates a turbine 1 according to one embodiment. The turbine 1 comprises casing 10 made up of a plurality of segments 11a, 11b, 11c, and 11d having arc-shaped cross-sections. In the present specification and claims, the term "arc-shaped cross-sections" refers to a cross-section of the segments 11a-11d as viewed from an intake end of the turbine 1. In addition, the segments 11a-11d are referred to throughout the specification and claims as arc-shaped segments.

Affixing protrusions 12 protrude from the casing 10 of the turbine 1. The affixing protrusions 12 affix the arc-shaped segments 11a-11d to adjacent arc-shaped segments 11a, 11b, 11c, or 11d. The affixing protrusions 12 extend only part-way along a length of the outer surface of the casing 10.

The turbine 1 further includes a rotor 20 having a shaft 21 and blades, or buckets, 22 extending from the shaft 21. An annular region R of the casing 10 encircles a portion of the casing 10 corresponding to the stage of buckets 22, and the annular region R does not include any affixing protrusions 12. Additional elements of the turbine 1, such as nozzles and stationary airfoils, are omitted for clarity in describing the present embodiment.

Although FIG. 1 illustrates a turbine 1 comprising four arc-shaped segments 11a-11d, in alternative embodiments the turbine comprises two, three, or more than four connected arc-shaped segments.

Figure 2:
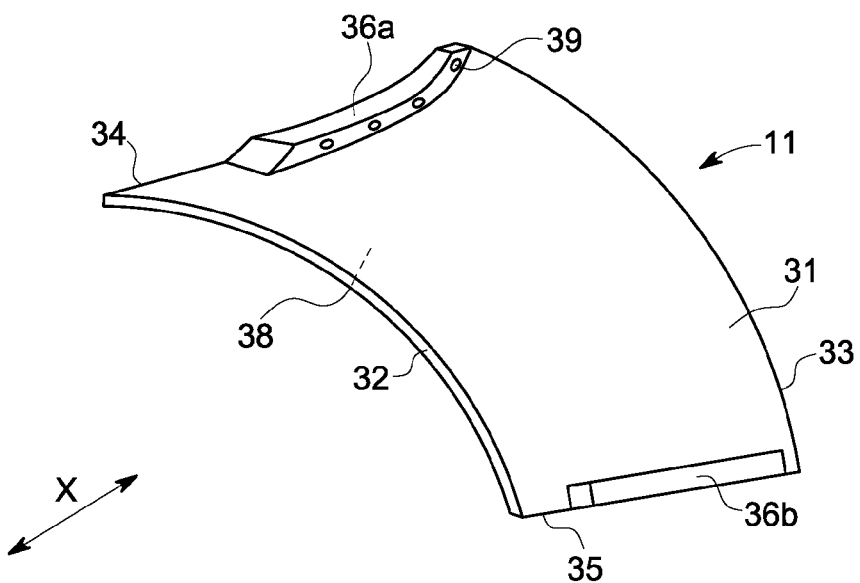
FIG. 2 is an arc-segment of the turbine.

FIG. 2 illustrates one of the arc-shaped segments 11 of the casing 10. Each arc-shaped segment 11 includes an outer surface 31, an inner surface 38, a front rim 32, a rear rim 33, and side edges 34 and 35. Flanges 36a and 36b extend radially outward from the outer surface 31 of the segment 11. The flanges 36a and 36b are located at opposing side edges 34 and 35 to connect to adjacent flanges of adjacent arc-shaped segments 11. When all of the arc-shaped segments 11 of the turbine 1 are connected by affixing adjacent flanges 36 to each other, the arc-shaped segments 11 form the turbine 1 having a circular cross-sectional shape.

The flanges 36a and 36b each have bolt holes 39 to have bolts inserted to affix the flanges 36a and 36b to adjacent flanges of adjacent arc-shaped segments 11. According to alternative embodiments, adjacent flanges 36 are connected to each other by clamps, welds, or other fixing devices.

The flanges 36a and 36b extend along the outer surface 31 of the arc-shaped segment 11 in a front-to-rear direction 11. However, a portion of the outer surface 31 of the arc-shaped segment 11 that is in-line with the flanges 36a and 36b does not include a flange. In other words, as illustrated in FIG. 2, no flange protrudes radially from the outer surface 31 of the arc-shaped segment 11 at an area adjacent to the front rim 32 of the arc-shaped segment 11 that is in-line with the flange 36a in a front-to-rear direction X.

Figure 3:
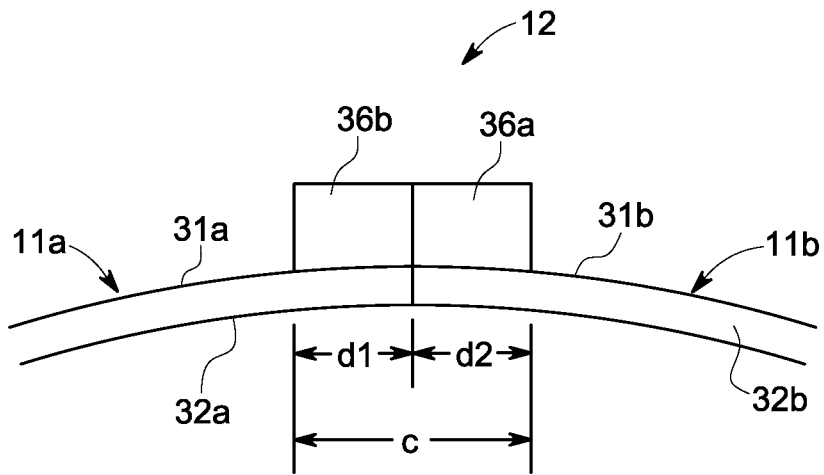
FIG. 3 is a front plan view of a connection portion of the turbine casing.

FIG. 3 illustrates a front view of a connection portion C of the turbine 1. FIG. 3 illustrates a first arc-shaped segment 11a connected to a second arc-shaped segment 11b. The flange 36b at one end of the first arc-shaped segment 11a is connected to the flange 36a at an end of the second arc-shaped segment 11b. The flange 36b has a width d1, and the flange 36a has a width d2. According to the present embodiment, the width d1 is the same as the width d2. However, in alternative embodiments, the flanges 36a and 36b have different widths.

A combined area of the outer surface 31a of the first arc-shaped segment 11a and an area of the outer surface 31b of the second arc-shaped segment 11b define a connection region C of the casing 10. The connection region C extends along the length of the arc-shaped segments 11a and 11b, and according to an embodiment of the present invention, the connection region C includes both a first portion from which the flanges 36a and 36b extend, and a second portion adjacent to the front rims 32a and 32b of the arc-shaped segments 11a and 11b from which the flanges 36b and 36a do not protrude.

Figure 4:
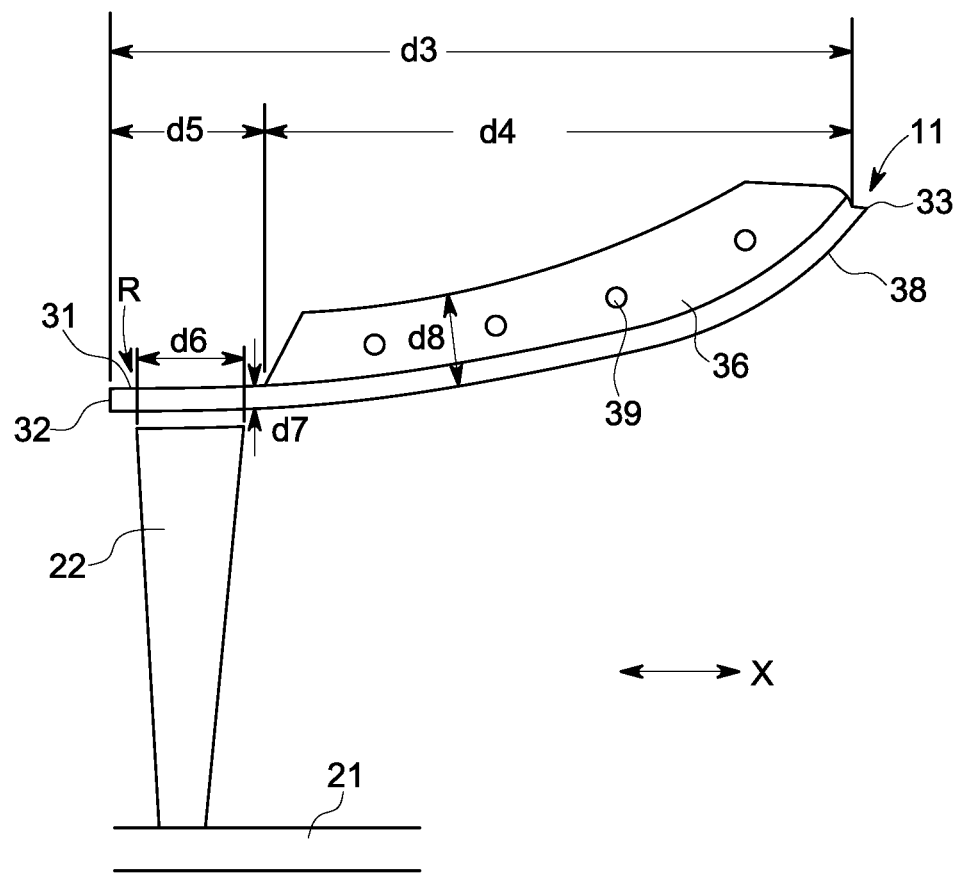
FIG. 4 is a side cross-section view of the connection portion of the casing.

FIG. 4 illustrates a side cross-section view of a portion of the turbine 1. The outer surface 31 of the arc-shaped segment 11 has a length d3 in a front-to-rear direction X. The flange 36 extends from the outer surface 31 along a length d4 of the arc-shaped segment 11. The length d4 is less than the entire length d3 of the outer surface 31, so that a region R of the outer surface 31 having a length d5 does not include the flange 36. The region R is aligned with the flange 36 in a front-to-rear direction. In other words, the region R having a length d5 lies within the connection region C illustrated in FIG. 3. In addition, the region R has an annular shape that encircles the turbine 1. In other words, while a cross-section of only one arc-shaped segment 11 is illustrated in FIG. 4, the region R corresponding to the length d5 extends around the entire turbine 1, as illustrated in FIG. 1.

The region R has a width d7 which corresponds to a width of the arc-shaped segment 11 without the flange 36. The portion of the arc-shaped segment 11 that includes the flange 36 has a width d8 that is greater than the width d7. FIG. 4 illustrates the region R having no protrusions, such as flanges, ribs, or mounting supports. Consequently, the thermal response of the region R is fast relative to the thermal response of the portion of the arc-shaped segment 11 including the flange 36. According to alternative embodiments, the region R includes one or more protrusions, such as mounting supports, but the protrusions have a small effect on the thermal response of the region R, and the protrusions have a width d7 less than the width d8 of the portion of the arc-shaped segment 11 including the flange 36.

The region R corresponds to a stage of buckets 22 of the rotor 20, and the length d5 may be greater than a length of the bucket 22. When the region R heats up and cools down during operation of the turbine 1, the thermal response of the region R is relatively fast and even, as compared to the portion of the casing 10 having the flanges 36. Consequently, the portion of the casing 10 including the region R maintains a substantially circular shape and rubbing of the buckets 22 against the casing 10 is avoided.

Although only one bucket 22 is illustrated in FIG. 4 for purposes of description, it is understood that buckets 22 are arranged around the shaft 21 in an annular manner, and each annular arrangement of buckets 22 makes up part of a stage. The stage may also include stationary vanes to form nozzles with direct fluid onto the buckets at predetermined angles. The vanes are omitted from FIG. 4 for clarity. In addition, while only one stage of buckets 22 is illustrated in FIG. 4 for clarity, the turbine 1 may include any number of stages.

According to the present embodiment, the region R is a portion of the outer surface 31 of the arc-shaped segment 11 that is adjacent to the front rim 32 in the front-to-rear direction X. However, according to alternative embodiments, the region R may be located adjacent to the rear rim 33 of the arc-shaped segment 11, or at any location between the front rim 32 and the rear rim 33 that corresponds to a stage of buckets 22. In addition, a plurality of regions R may be located on the arc-shaped segment 11, such as adjacent to both the front rim 32 and the rear rim 33.

Figure 5:
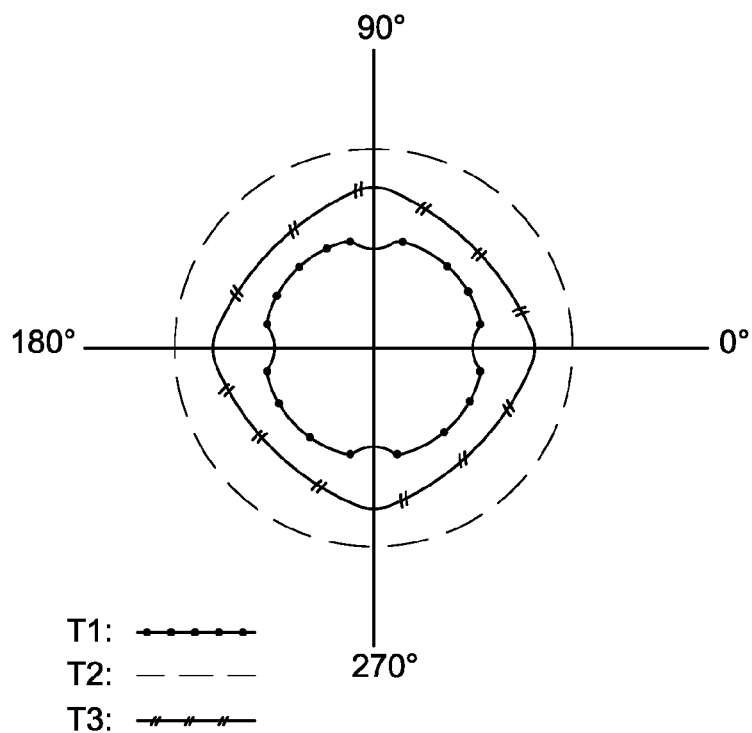
FIG. 5 is a diagram of casing deformation when flanges extend along the entire connection portion of the casing.
Figure 6:
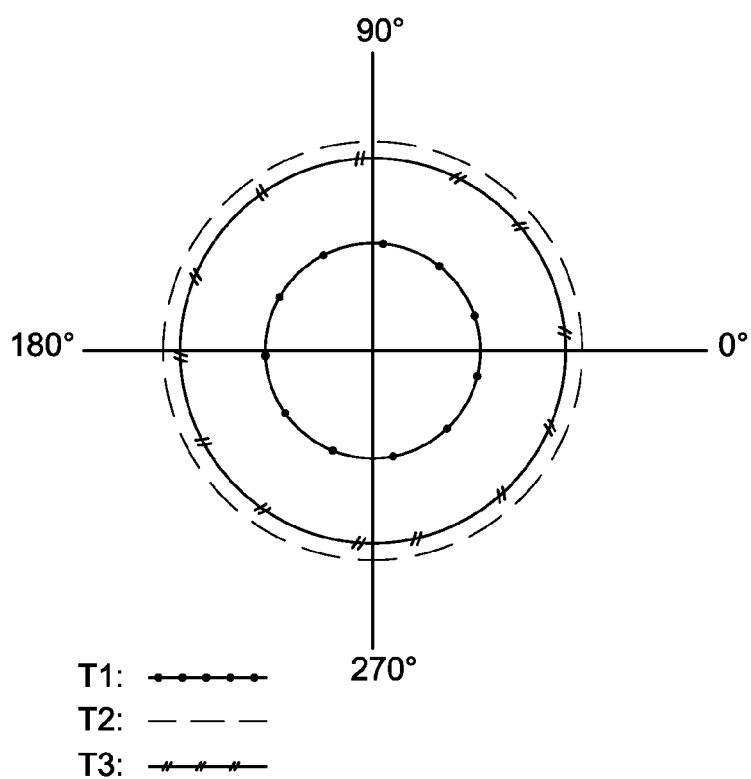
FIG. 6 is a diagram of casing deformation when flanges extend only part-way along the length of the casing.

FIGS. 5 and 6 illustrate comparative thermal responses of annular portions of a turbine 1 having four affixing protrusions 12 at 0 degrees, 90 degrees, 180 degrees, and 270 degrees, and a turbine 1 having no affixing protrusions in the annular portion, respectively. T1 represents a time after start-up and before the turbine 1 is at normal operating temperature. T2 represents a time when the turbine is at the normal operating temperature. T3 represents a time after a shut-down of the turbine 1 has been initiated, but before the temperature of the turbine has cooled to a non-heated state.

FIG. 5 illustrates the thermal response of the annular portion of the turbine 1 having the affixing protrusions 12. At time T1, the portions of the turbine 1 having the affixing protrusions 12 are heating up slower than the portions of the turbine 1 that do not include the affixing protrusions 12. As a result, the casing 10 of the turbine 1 warps, as illustrated by the protruding and recessed portions of the line representing T1. A physical result of the unequal heating illustrated by the line T1 of FIG. 5 is that the casing 10 becomes misshapen, and parts of the casing 10 bend outward and parts bend inward, resulting in rubbing of the buckets 22 against the casing 10.

At time T2, the casing 10 has expanded to have a substantially rounded shape. At time T3, the portions of the casing 10 having the affixing protrusions 12 cool slower than the portions of the casing 10 that do not have the affixing protrusions 12. Consequently, the casing 10 becomes misshapen and out-of-round, as discussed above.

FIG. 6 illustrates the thermal response of the annular portion of the turbine 1 that does not have the affixing protrusions 12. At time T1, the casing 10 expands consistently around the entire annular portion, and the annular portion retains a round shape. Similarly, at time T3, after the shut-down has been initiated, the annular portion of the casing 10 that does not have the affixing protrusions 12 cools consistently, maintaining a substantially round shape. Because the casing 10 maintains a round shape during heating and cooling, clearances between tips of the buckets 22 and the inside surface of the casing 10 may be designed to be smaller than a turbine 1 having affixing protrusions 12 extending an entire length of the turbine, and the smaller clearances result in greater efficiency of the turbine 1.

Figure 7:
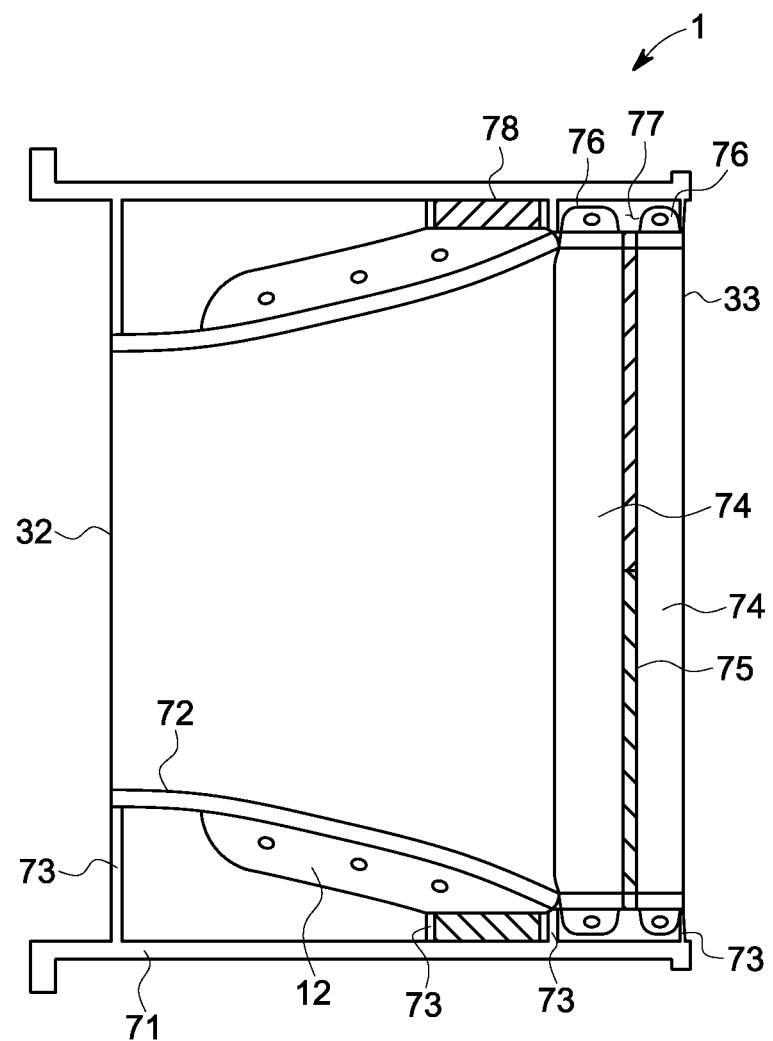
FIG. 7 is a cross-section view of a double-wall casing of a turbine.

FIG. 7 illustrates a side cross-sectional view of a double-wall casing of the turbine 1. The turbine 1 includes an outer shell 71 and an inner shell 72. The inner shell 72 corresponds to the casing 10 of FIG. 1, and includes the affixing protrusions 12 to connect segments of the inner shell 72 together, as illustrated in FIGS. 1-4.

The inner shell 72 includes a sloped portion and a plurality of cylindrical portions 74 at a rear end of the turbine 1. The cylindrical portions 74 include flanges 76. A cylindrical portion 75 between the cylindrical portions 74 does not include a flange 76, and a space 77 is located between the flanges 76. According to alternative embodiments, each of the cylindrical portions 74 and 75 includes flanges 76. In yet other embodiments, each of the cylindrical portions 74 and 75 is formed as a single body without segments and without flanges 76.

The outer shell 71 includes supports 73 to support the inner shell 72, while also allowing the inner shell 72 to expand and contract according to the thermal response characteristics of the inner shell 72. The supports 73 have an annular shape to encircle the inner shell 72 to provide an air-tight seal to prevent the escape of heated fluid from the turbine 1.

An annular seal 78 is located at a rear-most portion of the affixing protrusion to further seal the turbine 1. According to alternative embodiments, the affixing protrusion 12 extends outward to the outer shell 71 and no annular seal 78 is provided.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine, comprising:
  a casing having a plurality of arc-shaped segments to together form a substantially circular cross-section shape of the casing, the casing having a front rim to define a front opening and a rear rim to define a rear opening, and each plurality of arc-shaped segments extending in a front-to-rear direction between the front rim and the rear rim;
  an affixing protrusion extending radially from an outer surface of the casing at each junction of the plurality of arc-shaped segments to affix adjacent arc-shaped segments to each other; and
  an annular region on the outer surface of the casing adjacent the front rim of the casing and having no affixing protrusion, the annular region having a thickness from an inside surface to the outside surface less than a thickness of the casing at the affixing protrusion from the inside surface to the outside surface, wherein the affixing protrusion extends in the front-to-rear direction on the outer surface of the casing from the rear rim of the casing to the annular region.

2. The turbine of claim 1, wherein the affixing protrusion extends contiguously from the rear rim of the casing to the annular region.

3. The turbine of claim 1, wherein each affixing protrusion includes flanges radially extending from adjacent arc-shaped segments from among the plurality of arc-shaped segments.

4. The turbine of claim 3, wherein the flanges of adjacent affixing protrusions are connected by at least one of bolts, a clamp, and a weld.

5. The turbine of claim 1, further comprising:
  a rotor comprising a plurality of annular stages of buckets, wherein the annular region of the casing corresponds to a location of at least one of the annular stages of buckets.

6. The turbine of claim 5, wherein the annular region of the casing has a width greater than a width of bucket tips of the at least one annular stage of buckets.

7. The turbine of claim 6, wherein the annular region of the casing extends at least from the front rim of the casing to a rear side of the at least one annular stage of buckets.

8. The turbine of claim 1, wherein the casing comprises:
  an inner shell including the plurality of arc-shaped segments; and
  an outer shell surrounding the inner shell to provide an air-tight seal around the inner shell.

9. A turbine casing, comprising:
  a plurality of arc-shaped segments, each arc-shaped segment having: a front rim at a front end, a rear rim at a rear end, and a flange at each side end to connect to a flange of an adjacent arc-shaped segment from among the plurality of arc-shaped segments, the flange extending outward from an outer surface of the arc-shaped segment and extending along the outer surface in a front-to-rear direction, a portion of the outer surface located adjacent to the front rim that is co-linear with the flange in the front-to-rear direction and does not include the flange, the portion of the arc-shaped segment that does not include the flange having a width from an inner surface of the arc-shaped segment to the outer surface of the arc-shaped segment that is less than a width of the arc-shaped segment at the flange from the inner surface of the arc-shaped segment to the outer surface of the arc-shaped segment, wherein the flange extends from the rear rim to the portion of the outer surface that does not include the flange.

10. The turbine casing of claim 9, wherein each arc-shaped segment comprises the flange extending contiguously from the rear rim to the portion of the outer surface that does not include the flange.

11. The turbine casing of claim 9, wherein the portion of each of the plurality of arc-shaped segments that does not include the respective flange has a predetermined width.

12. The turbine casing of claim 9, wherein each arc-shaped segment comprises the front rim having a diameter smaller than the rear rim.

13. The turbine casing of claim 12, wherein each of the plurality of arc-shaped segments is curved between the front rim and the rear rim.

14. The turbine casing of claim 9, wherein each flange is connected to an adjacent flange with at least one of bolts, a clamp, and a weld.

\* \* \* \* \*